United States Patent [19]

Condon

[11] Patent Number: 4,460,019

[45] Date of Patent: Jul. 17, 1984

[54] SEWER AND DRAIN PLUG

[75] Inventor: Duane R. Condon, Ramona, Calif.

[73] Assignee: Condon Technologies, Inc., Ramona, Calif.

[21] Appl. No.: 467,520

[22] Filed: Feb. 18, 1983

Related U.S. Application Data

[63] Continuation-in-part of Ser. No. 274,812, Jun. 18, 1981, abandoned.

[51] Int. Cl.³ .............................................. G01M 3/02
[52] U.S. Cl. ...................................... 138/90; 73/49.1
[58] Field of Search .......................... D12/140; 4/256; 73/40.5 R, 49.1, 49.5; 134/166 C, 167 C, 168 C; 138/89, 90, 91, 93, 94; 285/254

[56] References Cited

U.S. PATENT DOCUMENTS

| | | | |
|---|---|---|---|
| 1,180,282 | 4/1916 | Bunn | 138/90 |
| 2,177,916 | 10/1939 | Thomas et al. | 138/90 |
| 2,279,257 | 4/1942 | Svirsky | 138/93 |
| 2,309,429 | 1/1943 | Ahern | 138/93 |
| 3,431,945 | 3/1969 | Robillard | 138/90 |
| 3,595,255 | 7/1971 | Mullinex | 134/167 C |
| 3,792,708 | 2/1974 | Tash | 134/167 C |
| 3,802,449 | 4/1974 | Mullinex | 134/167 C |
| 3,840,033 | 10/1974 | Warsinger | 134/167 C |
| 4,337,813 | 7/1982 | Rach et al. | D12/140 X |

*Primary Examiner*—Stephen Marcus
*Assistant Examiner*—Mark Thronson
*Attorney, Agent, or Firm*—Brown & Martin

[57] ABSTRACT

A plug for sealing a sewer or drain conduit and for simultaneously filling the conduit so that the drainage system may be inspected for leaks. A tubular bulb made of an elastomeric material has fluid under pressure supplied to its internal cavity from one end. The bulb expands laterally of its longitudinal axis to thereby seal the conduit in which it is located. Thereafter, a spill over valve coupled to the other end of the bulb releases fluid from the bulb while maintaining the expanded size of the bulb and the sealing engagement between the bulb and the conduit. The bulb may have an external waffle surface to enhance sealing and reduce the likelihood of bulb rupture from sharp pipe edges. The spill over valve includes external channels through which fluid may pass upon sufficient expansion of the overlying bulb. Embodiments are disclosed which include a second bulb for sealing a branch conduit. One of the dual bulb embodiments has a control valve for selectively permitting both bulbs to be simultaneously inflated, both bulbs to be simultaneously deflated, and the second bulb to be deflated independent and prior to the deflation of the first bulb.

23 Claims, 18 Drawing Figures

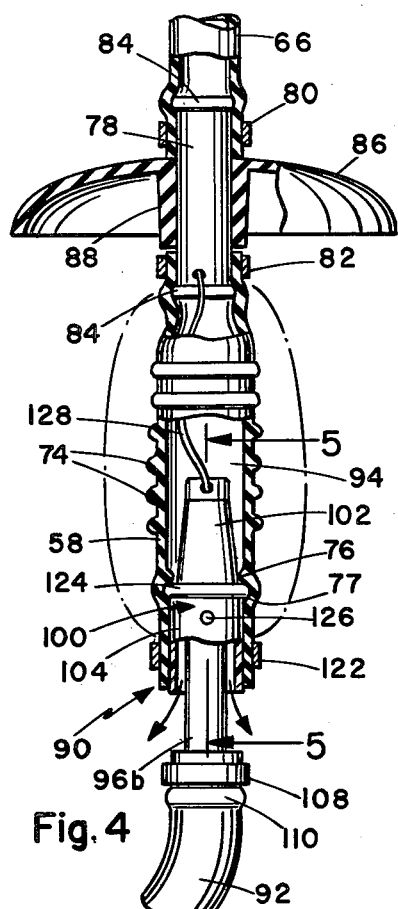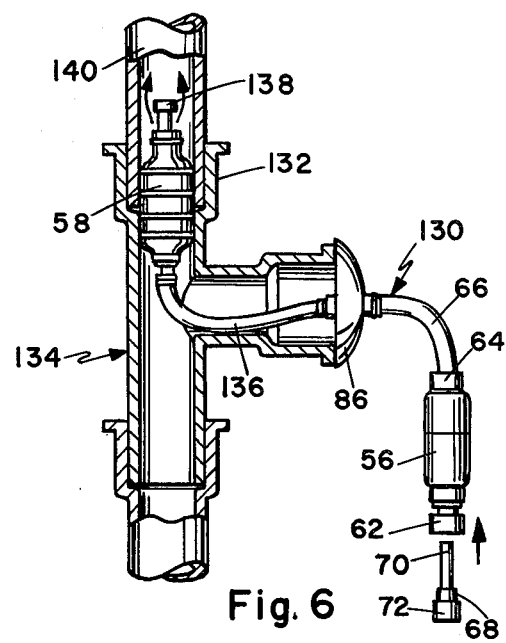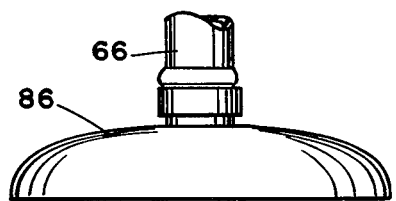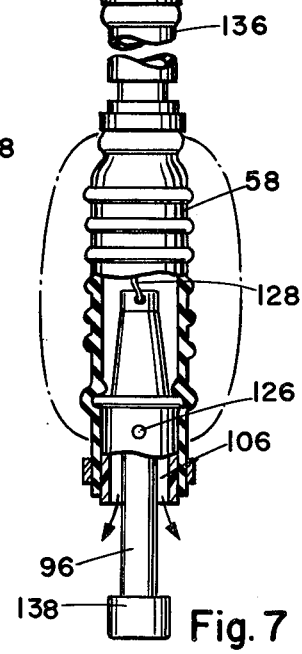

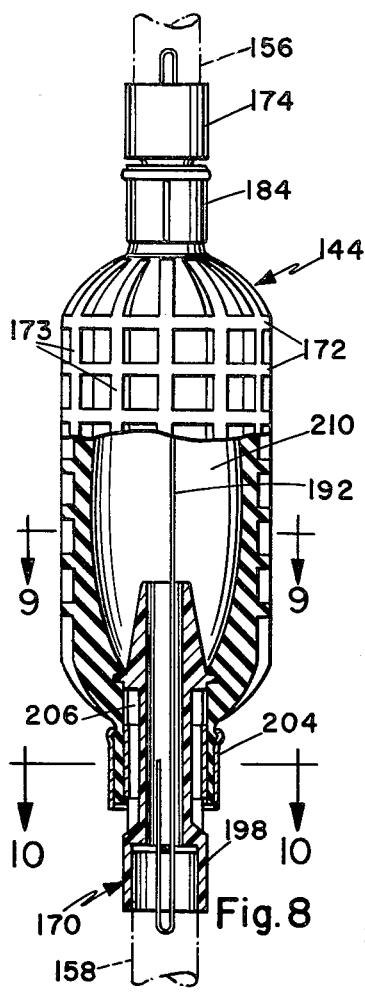
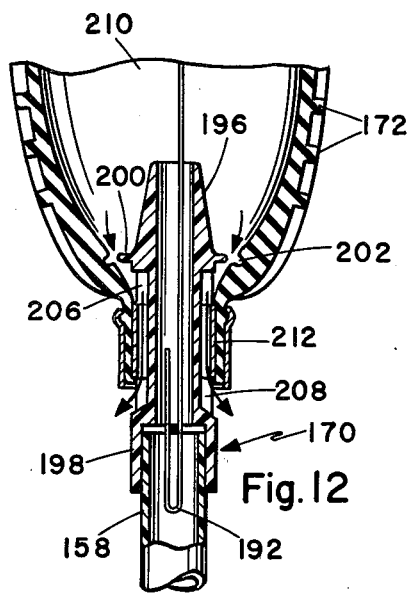
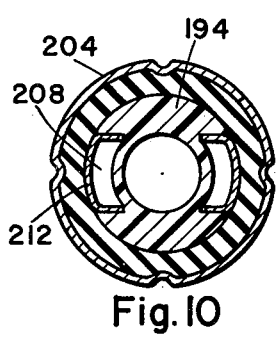
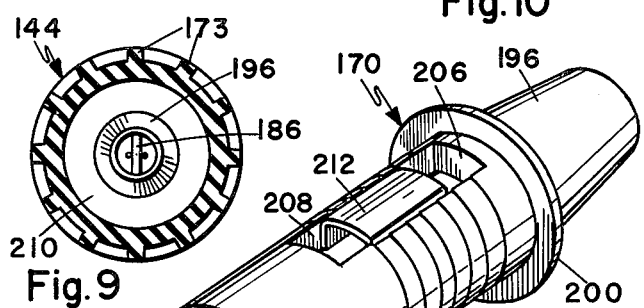
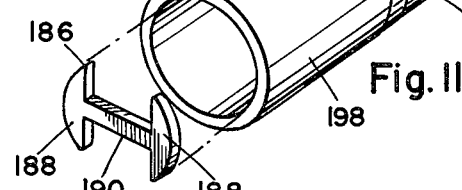
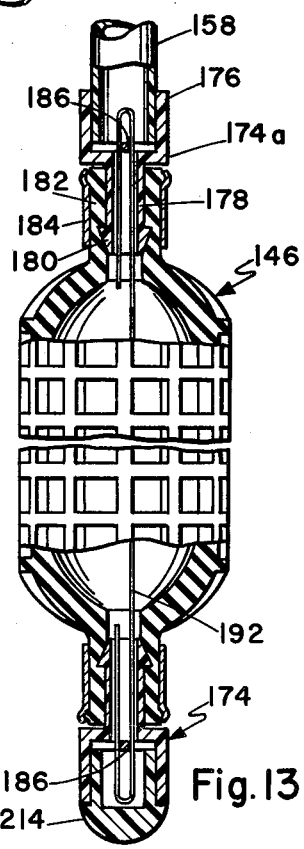

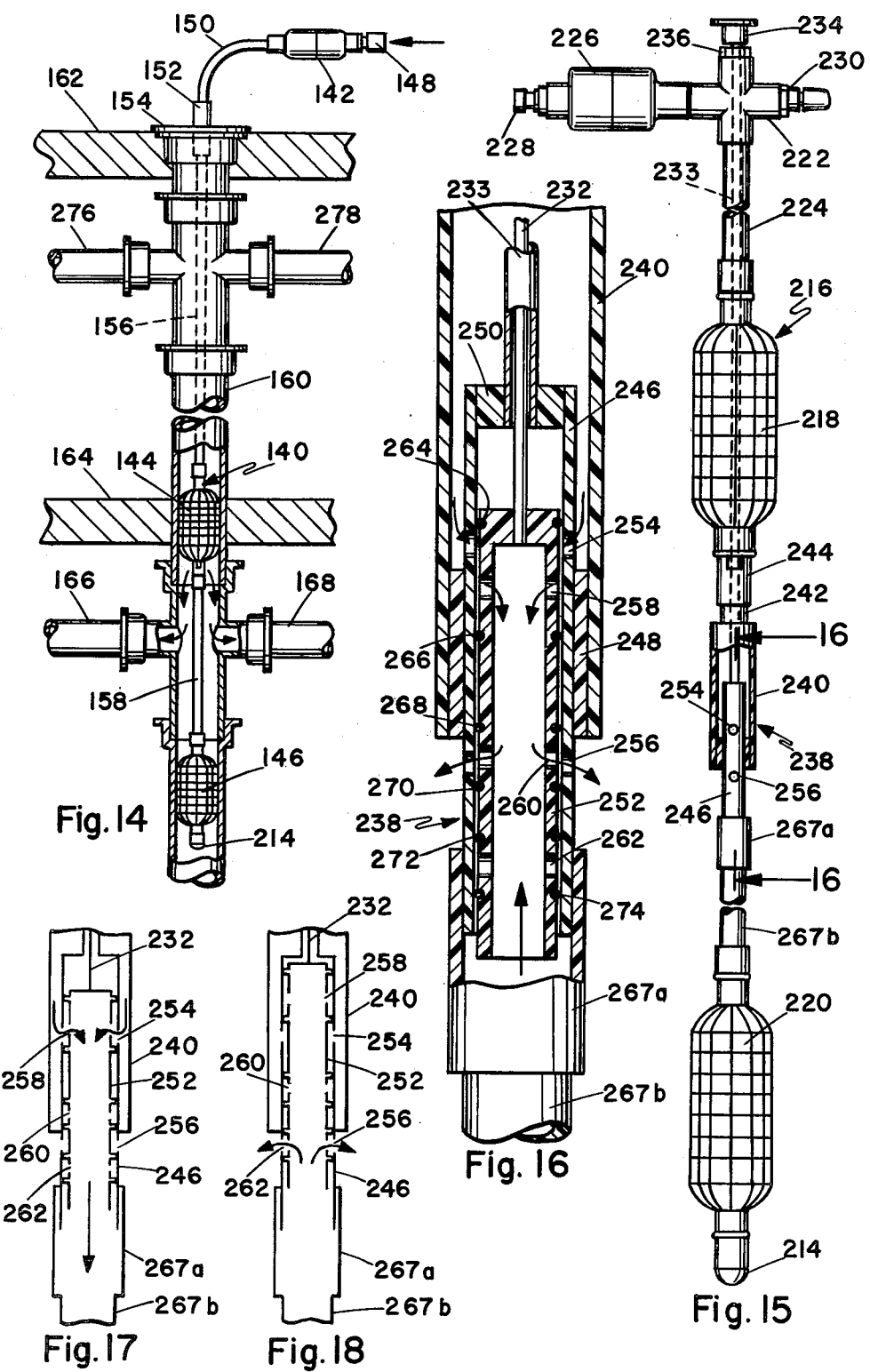

SEWER AND DRAIN PLUG

CROSS-REFERENCE TO RELATED APPLICATION

This application is a continuation-in-part of my U.S. patent application Ser. No. 274,812 filed June 18, 1981 and now abandoned.

BACKGROUND OF THE INVENTION

The present invention relates to plumbing, and more particularly, to an improved sewer and drain plug for testing plumbing installations.

Building and plumbing codes frequently require that various types of plumbing installations be subjected to a water pressure test following completion to determine the presence or absence of leaks. This is normally accomplished by inserting into the sewer line or drain an expansible plug. The plug forms a sealed closure in the sewer line so that the line may be filled above or below the plug with water and the system inspected for leaks. Where codes allow, plugs are also used to perform a similar air pressure test of plumbing installations.

If the sewer line or drain is branched, for example if it incorporates a Y, T or similar pipe construction, it is desirable to be able to plug both the main sewer line and also the branch. This allows water used for testing to be confined in the sewer line above the plugging device.

In the past, a number of devices have been utilized to perform water pressure testing of plumbing installations. For example, a cap can be screwed or glued in place before a dwelling drain system is coupled to a municipal sewer line. However, this approach is time consuming and requires that the caps be removed before the plumbing installation can be completed.

U.S. Pat. No. 2,177,916 discloses a plumber's test plug having a pair of mechanically expansible balls, each of which may be expanded independently of the other from the same end of the device. The connection between the balls is flexible so that the device may be inserted through a branch, and one ball expanded into engagement with the sewer line or drain and the other ball expanded into engagement with the branch. This device is cumbersome and heavy. A pair of nuts must be separately rotated both to expand and contract the balls, thus making installation and removal time consuming. Furthermore, this device has a complicated mechanical construction and is subject to faulty operation due to rust.

Presently, pneumatically inflatable plugs are widely used to perform water pressure testing of plumbing installations. Upon deflation, the plugs are removed by pulling on a ring which remains clear of the sewer line and is connected to the plug by a chain. These pneumatic test plugs are available in a wide variety of sizes and configurations from Cherne Industries, Inc., 5701 South County Road 18, Minneapolis, Minn. 55436. Pneumatic test plugs of this type can explode if over inflated. This can occur if the user fails to correctly utilize a hand operated air pump with a pressure gauge. The danger of explosion is particularly acute where such pneumatic test plugs are inflated, contrary to manufacturers' warnings, from a high pressure gas source. Additionally, it is not uncommon for the chain which connects the pull ring to the inflatable plug to break when attempting to remove the plug while still inflated, contrary to manufacturers' instructions. If this occurs, frequently the plug will be sucked downstream in the system by the head of test water. One or more sewer lines must then be opened to remove the deflated plug to prevent the plumbing installation from clogging.

Additionally, with many of the above prior art approaches, it is necessary to seal or plug the plumbing installation to be tested at one location and then to fill the installation with a suitable head of water at another location. This often requires that hoses be dragged through a building, adding to the time and inconvenience required to perform this type of test.

Recently, some individuals have purportedly performed the water pressure test utilizing a device sold under the trademark DRAIN KING, Model 186, manufactured by G.T. Water Products, Inc., 19438 Business Center Drive, Northridge, Calif. 91324. This device is actually intended for use in unclogging drains. It has an expansible bulb which is coupled to a water hose by a worker. In normal use, the bulb is installed in the clogged drain line. When the water to the hose is turned on, the bulb inflates, sealing the drain line. An internal surge valve within the bulb sends high pressure water pulses through the line to loosen and clear blockage. This device cannot be utilized to pressure test a sewer system for a Y type clean-out junction since it can only seal one pipe. The amount of seal provided by this device fluctuates with the water pulses. Once the water hose is disconnected, the bulb deflates. A worker would have to use multiple hoses to test several plumbing installations at once. U.S. Pat. Nos. 3,595,255; 3,792,708; 3,802,449; and 3,840,033 appear to relate to the aforementioned DRAIN KING device.

Also of interest in this field are U.S. Pat. Nos. 1,180,282; 2,279,257; 2,309,429; and 3,431,945.

SUMMARY OF THE INVENTION

It is therefore the primary object of the present invention to provide an improved sewer and drain plug for subjecting a completed plumbing installation to a water or gas pressure test.

It is another object of the present invention to provide an improved sewer and drain plug of the aforementioned type which will permit simultaneous sealing and filling of the plumbing installation to be tested from a single location.

It is still a further object of the present invention to provide an improved sewer and drain plug of the aforementioned type which has a simple, durable construction.

Yet another object of the present invention is to provide a sewer and drain plug of the aforementioned type which is safer to use than prior devices.

Another object of the present invention is to provide a sewer and drain plug of the aforementioned type in which a pair of bulbs are inflated to seal two different branches of a pipe construction.

Another object of the present invention is to provide a sewer and drain plug of the aforementioned type which permits independent deflation of the downstream bulb.

Another object of the present invention is to provide a sewer and drain plug of the aforementioned type which has a novel spill over valve construction.

Accordingly, the present invention provides a plug for sealing a sewer or drain conduit and for simultaneously filling the conduit so that the drainage system may be inspected for leaks. A tubular bulb made of an elastomeric material has fluid under pressure supplied to its internal cavity from one end. The bulb expands laterally of its longitudinal axis to thereby seal the conduit in which it is located. Thereafter, a spill over valve coupled to the other end of the bulb releases fluid from the bulb while maintaining the expanded size of the bulb and the sealing engagement between the bulb and the conduit. The device can operate with pressurized water, or can operate with pressurized gas where desirable, for example in freezing temperatures or where water is not readily available. The bulb may have an external waffle surface to enhance sealing and reduce the likelihood of bulb rupture from sharp pipe edges. The spill over valve includes an annular lip which engages a groove in the bulb. Fluid passes through external channels in the spill over valve upon sufficient expansion of the overlying bulb. All the parts can be made of materials that will not rust. Embodiments are disclosed which include a second bulb for sealing a branch conduit. One of the dual bulb embodiments has a control valve for selectively permitting both bulbs to be simultaneously inflated, both bulbs to be simultaneously deflated, and the second bulb to be deflated independent and prior to the deflation of the first bulb.

BRIEF DESCRIPTION OF THE DRAWINGS

FIG. 4 is an enlarged, fragmentary, part section and part elevation, view of the first embodiment of the sewer and drain plug of the present invention.

FIG. 5 is a further enlarged, vertical sectional view of a portion of the first bulb and the spill over valve of the first embodiment of the device, taken along line 5—5 of FIG. 4.

FIG. 6 is an elevation view of a second embodiment of the present invention shown installed in a T pipe construction illustrated in vertical section.

FIG. 7 is an enlarged, fragmentary, part section and part elevation view of the second embodiment.

FIG. 8 is a partially sectioned view of the upper bulb and spill over valve of a third embodiment of the present invention.

FIG. 9 is a sectional view taken along line 9—9 of FIG. 8.

FIG. 10 is an enlarged sectional view taken along line 10—10 of FIG. 8.

FIG. 11 is an enlarged perspective view of a component of the spill over valve of the third embodiment.

FIG. 12 is an enlarged view similar to the lower portion of FIG. 8, with the bulb inflated and illustrating the operation of the spill over valve of the third embodiment.

FIG. 13 is a partially sectioned view of the lower bulb of the third embodiment.

FIG. 14 illustrates a multiple floor drainage system with the third embodiment installed therein to isolate one floor for testing.

FIG. 15 is a side elevation view partially cut away of a fourth embodiment of the present invention which has a three-way control valve.

FIG. 16 is an enlarged sectional view taken on line 16—16 of FIG. 15, with the control valve of the fourth embodiment positioned to allow simultaneous deflation of both bulbs.

FIG. 17 is a diagrammatic view of the valve of the fourth embodiment positioned to inflate both bulbs.

FIG. 18 is a diagrammatic view of the valve of the fourth embodiment positioned to permit deflation of the lower bulb only.

DESCRIPTION OF THE PREFERRED EMBODIMENTS

Figure 1:
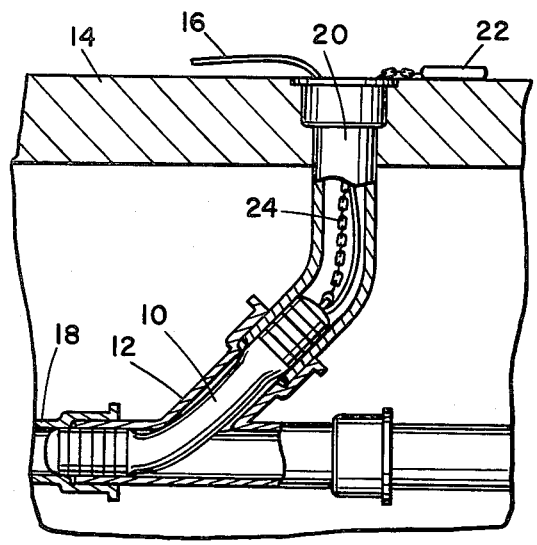
FIGS. 1 and 2 are part section, part elevation views illustrating two forms of prior art pneumatically inflatable plugs which are widely used to perform water pressure testing of plumbing installations.

FIG. 1 illustrates one form of a prior art pneumatically inflatable plug 10 installed in a Y pipe construction 12 partially embedded in the concrete slab foundation 14 of a building. The plug 10 is installed in the Y pipe construction 12 when the plug is deflated so that its opposite ends are located in the main sewer line and branch line. Thereafter, the plug is inflated through a hose 16 utilizing a gauge operated hand operated air pump (not shown). A water hose is then used at another location to fill the sewer pipe system ahead of the Y pipe construction 12. The seals provided by the inflated plug 10 prevent the head of test water from flushing into the municipal sewer connection pipe 18 or from escaping upwardly through vertical pipe 20. The sewer pipe system in the building is inspected for leaks. Upon completion of the test, the plug 10 is deflated through hose 16. A ring 22, which is connected to one end of the plug 10 by a chain 24, is pulled to remove the deflated plug from the Y pipe construction 12. The diameter of the ring 22 is sufficiently large so that it cannot be pulled through the pipe 20, thereby preventing the plug 10 from being flushed down the pipe 18, providing that the chain 24 does not break.

Figure 2:
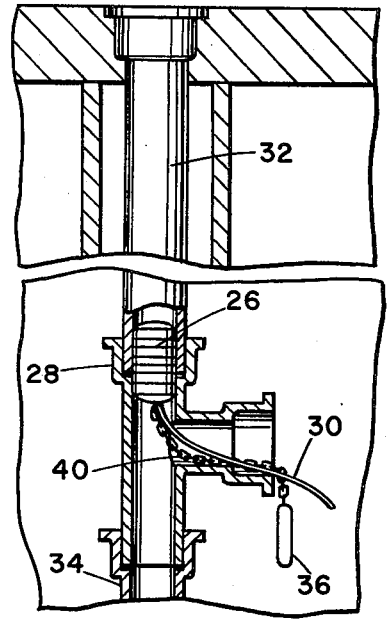

FIG. 2 illustrates another form of a prior art pneumatically inflatable plug 26 which is shorter in length than the plug 10 (FIG. 1). The plug 26 is utilized to seal one branch of a T pipe construction 28 (FIG. 2). The plug 26 is installed when deflated and is thereafter inflated through a hose 30. A pipe system 32 above the plug is thereafter filled with water at another location and the system is inspected for leaks. Thereafter, the plug 26 is deflated through the hose 30, allowing the test head of water to flush through a drain pipe 34. The deflated plug may then be removed from the T pipe construction 28 by pulling on a ring 36 connected to one end of the plug by a chain 40.

It will thus be observed that in utilizing the prior art devices illustrated in FIGS. 1 and 2, it is necessary to seal the plumbing installation to be tested at one location and then to fill the installation with a suitable head of water at another location. This often requires that hoses be dragged through the building, adding to the time and inconvenience required to perform this type of test.

Figure 3:
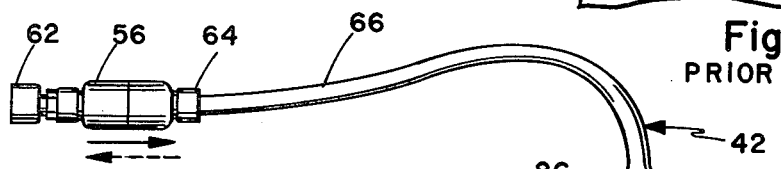
FIG. 3 is an elevation view of a first embodiment of the sewer and drain plug of the present invention shown installed in a Y pipe construction illustrated in vertical section.
Figure 3:
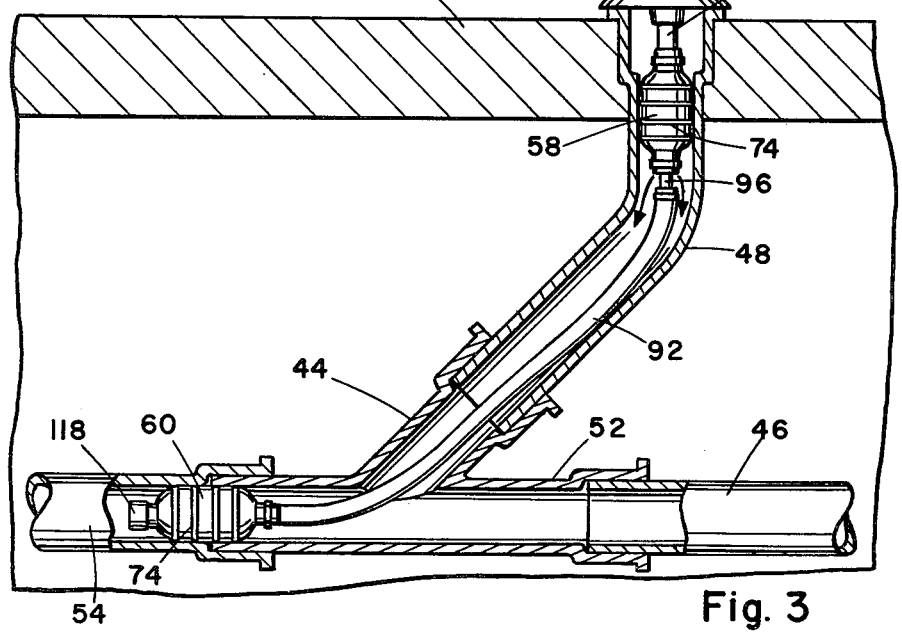

FIG. 3 illustrates a first embodiment 42 of my sewer and drain plug which may be installed in a branched pipe construction 44 to subject an installed pipe system 46 to a water pressure test. The pipe construction 44 may be the building sewer connection clean-out. It may include a branch or leg 48 which extends upwardly through a slab foundation 50, and a main line 52. The building sewer pipe system 46 is connected to the forward end of the main line 52. A municipal sewer connection pipe 54 is connected to the rearward end of the main line 52.

The first embodiment 42 of my sewer and drain plug includes a check valve 56, a first expansible bulb 58 and a second expansible bulb 60 which are connected in series to a source of pressurized fluid (not shown) such as water, at for example, 40 PSI. A quick disconnect coupling or screw-on type coupling 62 is connected to a first end of a check valve 56 for connecting the check valve to, for example, a standard garden type hose or a spigot. The device may also be connected to a source of pressurized gas where it is desired to test the plumbing installation with gas pressure instead of water pressure. Another coupling 64 connects the second end of the check valve to a flexible hose 66 which connects the check valve with the first bulb 58.

A check valve 56 (FIG. 3) normally permits only one-way flow of fluid therethrough from its first end to its second end as shown by the solid arrow in FIG. 3. The check valve 56 includes an internal diaphragm and a spring biasing mechanism which can be manually actuated utilizing a tool 68 (FIG. 6). The tool 68 (FIG. 6) includes a shaft 70 which is connected to a retaining handle or knob 72. The diameter of the shaft 70 is sufficiently small so that it can be inserted through the coupling 62 and into the check valve 56 (FIG. 3). The length of the shaft 70 of the tool 68 is also sufficient to permit its remote end to contact and move the diaphragm of the check valve. The knob 72 (FIG. 6) of the tool is large enough to prevent the tool from being lost within the coupling 62 and the valve 56. When the tool is inserted in the check valve, it moves the diaphragm against the spring bias to permit reverse flow through the valve. This flow direction is shown by the arrow in phantom lines in FIG. 3.

One suitable check valve is part number 1001-07 sold under the trademark FLO by Flo-Control, Inc., 3210 Winona Avenue, Burbank, Calif. 91504. That check valve has a cylindrical casing made of PVC plastic and is rated at 200 PSI. The casing has three-quarter inch female threaded couplings at each end and includes an internal diaphragm biased by a one-half pound spring.

The bulbs 58 and 60 (FIG. 3) are made of an elastomeric material such as natural rubber. This material is preferred over synthetic rubber or vulcanized rubber since natural rubber has the most superior stretching properties and durability. Each bulb has an elongated shape including a pair of ends each defining an opening which communicates with the internal cavity of the bulb. The collapsed configurations of the bulbs 58 and 60 are shown in FIG. 4. Each bulb may consist of a tubular piece of elastomeric material having a plurality of annular ribs 74 surrounding its intermediate section. The bulb 58 also includes an inwardly projecting annular lip 76 and an annular groove 77 (FIG. 5). Each bulb may be expanded laterally of its longitudinal axis as illustrated in phantom lines in FIG. 4 by a predetermined amount of internal fluid pressure. In their expanded conditions as shown in FIG. 3, the bulbs 58 and 60 provide fluid tight seals in the branch 48 and the main line 52 of the pipe construction 44. The annular ribs 74 serve as gaskets or washers to insure that the bulbs have enough friction with the pipe walls to prevent slippage.

Means are provided for connecting the end of the hose 66 (FIG. 3) remote from the check valve with a first end of the first expansible bulb 58. Specifically, as shown in FIG. 4, the remote end of the hose is fit over one end portion of a pipe segment 78. A first end of the first bulb 58 is fit over the other end portion of the pipe segment 78. The hose 66 and the first bulb 58 are secured to the pipe segment 78 by suitable means such as clamps 80 and 82. Flared portions 84 at the opposite ends of the pipe segment 74 serve to prevent the clamps 80 and 82, and the portions of the hose 66 and the bulb 58 held thereby, from slipping off the ends of the pipe segment 78.

An annular stop cap 86 (FIGS. 3 and 4) surrounds the pipe segment 78. The stop can 86 includes a central cylindrical neck portion 88 which is rigidly secured to the pipe segment 78. The stop cap is thus positioned between the hose 66 and the bulb 58. Preferably, the diameter of the stop cap 86 is sufficiently large to prevent it from being pulled inside the branch pipe 48 (FIG. 3) into which the bulbs of the device are inserted. The stop cap thus prevents the device from being flushed or sucked down the sewer connection pipe 54. In addition, preferably the stop cap 86 is made of a material having a high impact strength. During inflation of the bulbs 58 and 60, if one of the bulbs should explode, the stop cap 86 will prevent water from blowing out onto the workman. More importantly, the stop cap 86 will prevent fragments of the device from blowing out the branch pipe 48 and injuring the workman.

A spill over valve designated generally with the reference numeral 90 in FIG. 4 is inserted into the second end of the first bulb 58. Another flexible hose 92 connects the spill over valve 90 with a first end of the second bulb 60. After the device has been installed into a pipe construction as shown in FIG. 3, the check valve 56 is connected to a source of pressurized fluid, such as water, utilizing the connector 62. Water is conveyed through a hose 66 into the cavity 94 (FIG. 4) of the first bulb 58. Water also passes from the cavity 94 of the first bulb through a tube 96 (FIG. 5), through the hose 92 and into the cavity 98 of the second bulb 60. Water continues to flow into both of the bulbs, causing them to expand to predetermined sizes shown in phantom lines in FIG. 4. Once these sizes are reached, water is expelled from the spill over valve 90 as shown by the arrows in FIGS. 3 and 4. However, because of the construction of the valve 90, the predetermined expanded sizes of the bulbs are maintained. It should be understood that the predetermined expanded sizes will depend upon the inside diameters of the pipes in which the bulbs are installed.

By way of example, the bulbs may be designed to seal either three or four inch inside diameter pipe and to collapse to a diameter of less than one and one-half inches to permit easy withdrawal. Referring to FIG. 3, both the branch 48 and the main line 52 will be sealed since the bulbs maintain their expanded sizes. Water delivered from the spill over valve will fill up the pipe system 46 to provide the head of water necessary to perform the pressure test of the plumbing installation.

Thus, it can be seen that the device of FIG. 3 permits both sealing and filling at one location in one operation. When the device is connected to pressurized water, the bulbs are expanded to provide the necessary seals. Immediately thereafter, excess water spills over to fill the system which is to be tested. Once the necessary head of water has been established in the sewer pipe system, the source of pressurized fluid may be disconnected from the coupling 62 (FIG. 3) and the check valve 56 will prevent water from flowing back out of the bulbs 58 and 60. As a result, the bulbs stay inflated and maintain their seals. Once the plumbing system has been inspected for leaks and the test is concluded, the tool 68 (FIG. 6) may be utilized to deflate the bulbs. The device can then be removed from the pipe construction at the clean-out. As explained before, the shaft 70 of the tool is inserted through the coupling 62 (FIG. 3) into the check valve 56 until the diaphragm of the check valve is depressed, overcoming its spring biasing mechanism. This permits pressurized water within the bulbs 60 and 58 to flow backward through the hose 66 and through the check valve in the direction of the arrow in phantom lines in FIG. 3. The bulbs deflate and the device can be removed from the Y pipe construction 44.

The spill over valve 90 includes a member 100 having a frusto-conical first end 102 and a generally cylindrical second end 104 about which the lower end of the bulb lies in contracted engagement. A central bore 106 extends through the cylindrical second end 104 of the member 100. The tube 96 of the spill over valve 90 extends axially through the bore 106. A first end 96a of the tube is snugly fit into a corresponding cylindrical recess 107 formed in the frusto-conical part 102 of the member. The interior of the tube 96 communicates with a hole 108 which extends through the upper end of the frusto-conical part 102. One end of the flexible hose 92 is fit over the second end 96b of the tube as shown in FIG. 4. The hose 92 is securely held to the tube end 96b by a clamp 108. The tube end 96b also has a flared portion formed at its lower end for retaining the clamp 108 and the hose 92. This flared portion of the tube 96 is not visible in FIG. 4, however, the protrusion 110 in the hose 92 which is fit over one end of a tube segment 112. The hose 92 is secured to the tube segment by a clamp 114. The tube segment 112 also has a flared portion which serves to retain the clamp 114 and the hose 92. Barbed fittings may be utilized to retain the hose ends and bulb ends.

One end of the second bulb 60 (FIG. 4) is fit over the other end of the tube segment 112. The bulb 60 is secured to the tube segment 112 by a clamp 116. A flared end portion of the tube segment 112 serves to retain the clamp 116 and the bulb 60. Thus, fluid within the cavity 94 of the first bulb can flow through the hole 108 (FIG. 5), through the tube 96, through the hose 92 (FIG. 4), and through the tube segment 112 into the cavity 98 of the second bulb. The opening at the remote end of the second bulb 60 is sealed by a stopper 118 which is fit within the remote end of the second bulb. The second bulb is secured to the stopper by a clamp 120. The stopper has a retaining flange 121.

Referring again to FIG. 5, the end of the first bulb 58 which is remote from the stop cap 86 surrounds the frusto-conical and cylindrical parts 102 and 104 of the member 100. The bulb 58 is secured to the cylindrical part 104 by a clamp 122. An annular flange 124 extends outwardly from the outer surface of the member 100 between the parts 102 and 104, and just rearwardly of the lip 76 of the bulb 58. Holes such as 126 (FIGS. 4 and 5) extend through the cylindrical part 104 of the member and connect the region exterior of the cylindrical part with the bore 106.

Before the bulb 58 is expanded, it has the general configuration shown in FIG. 4 in which the lip 76 is in engagement with the flange 124 and the flange is seated in the groove 77 to provide a seal. This seal prevents water or other fluid within the cavity 94 of the first bulb from passing through the holes 126 and out of the bore 106. It will be understood that the spill over valve 90 is sized sufficiently with respect to the elastomeric bulb 58 so that the lower end of the bulb squeezes against the cylindrical outer surface of the part 104 of the valve. When the complete device is first connected to a source of pressurized water at the coupling 62 (FIG. 3), the water first fills the inner cavity of the first bulb 58 and the inner cavity of the second bulb 60 by passing through the tube 96 and the hose 92. The pressure of the water is sufficient to cause the bulbs to simultaneously expand to predetermined sizes indicated by the phantom lines in FIG. 4. This causes the lip 76 (FIG. 5) of the first bulb 58 to disengage from the flange 124, and the groove portion 77 of the bulb 58 to pull away from the flange, permitting water to flow through the holes 126 and out the bore 106 as indicated by the arrows in FIGS. 3, 4 and 5.

The end of the bulb 58 (FIG. 4) with the spill over valve 90 inserted therein yields to permit fluid to escape out the bore 106 and into the branch pipe 48 (FIG. 3). This spillage does not cause the bulbs to deflate. When the pipe system 46 has been filled with the necessary head of water, the coupling 62 may be disconnected from the garden hose, faucet, etc. The end of the first bulb 58 which surrounds the spill over valve will contract slightly so that the lip 76 and the groove portion 77 once again engage the flange 124. The check valve 56 will prevent water from within the bulbs from escaping out the coupling 62. The bulbs thus remain sufficiently inflated to provide the required seal.

Another feature of the first embodiment of my sewer and drain plug is that a flexible connection mechanism is provided between the spill over valve 90 and the stop cap 86. Thus, if the first bulb 58 should burst due to a defect, incision, or excessive test or back pressure, the mechanical connection will keep the spill over valve 90, the hose 92 and the second bulb 60 from being sucked down the sewer connection pipe 54. In the illustrated embodiment, the mechanical connection takes the form of a NYLON rope 128 which is tied at one end to the pipe segment 78 and at its other end to the frusto-conical part 102 of the spill over valve.

A second embodiment 130 of my invention is illustrated in FIGS. 6 and 7. It incorporates only a single expansible bulb 58. The second embodiment may be utilized, for example, to seal the branch 132 of a T pipe construction 134. A hose 136 extends between the stop cap 86 and the entry end of the bulb 58. The other end of the bulb 58 has the same spill over valve 90 inserted therein. The end of the tube 96 which extends outside of the bulb 58 is sealed with a cap 138. The second embodiment thus eliminates the hose 92 and the second bulb 60 of the first embodiment. The second embodiment otherwise has the same construction as the first embodiment.

When the second embodiment is used, the deflated bulb 58 is inserted into the branch 132 (FIG. 6) which is to be sealed. The coupling 62 at one end of the check valve 56 is then connected to a source of pressurized fluid such as water. The bulb 58 immediately expands to its inflated size shown in phantom lines in FIG. 7 and in solid lines in FIG. 6. Thereafter, water flows out the bore 106 as indicated by the arrows in FIGS. 6 and 7, filling the pipe system 140 which is to be tested.

A third embodiment 140 of my sewer and drain plug is illustrated in FIG. 14. It is installed in a multiple floor drainage system so as to isolate one floor for testing. Specifically, the third embodiment includes a check valve 142, an upper expansible bulb 144, and a lower expansible bulb 146. A quick disconnect or screw-on type coupling 148 is connected to one end of the check valve 142 for connecting the check valve to a source of pressurized water. A flexible hose 150 connects the other end the check valve to one end of a pipe connector 152. The pipe connector 152 extends through and is rigidly connected to a flat disk 154. The diameter of this disk is sufficiently large so that it prevents the entire sewer and drain plug from falling into the drainage system being tested. The disk also serves to prevent water from splashing back out of the drainage system and it protects the operator if one of the bulbs should explode. A length of hose 156 (FIG. 14) couples the connector 152 to the upper end of the bulb 144. Another length of hose 158 connects the lower end of the upper bulb to the upper end of the lower bulb 146.

The third embodiment 140 (FIG. 14) may be used in testing a draining system such as that illustrated in FIG. 14. This drainage system basically comprises a vertical stack 160 which extends through two floors 162 and 164 of a building. The lengths of the hoses 156 and 158 are such that the upper and lower bulbs 144 and 146 may be dropped down the stack 160 and will be positioned on opposite sides of horizontal feed pipes 166 and 168 when the disk 154 lies against the upper surface of the floor 162. The sewer and drain plug 140 is inserted into the stack 160 when its bulbs are deflated. After the device has been inserted, the coupling 148 may be connected to a source of pressurized water. This causes the bulbs 144 and 146 to expand and create seals on either side of the drain pipes 166 and 168. Once the upper bulb 144 has expanded to provide a tight seal, water thereafter exits downwardly out of this bulb through a spill over valve hereafter described. The drain pipes 166 and 168 are filled with water as indicated by the arrows in FIG. 14.

FIG. 8 illustrates details of the upper bulb 144 and spill over valve 170 of the third embodiment of my sewer and drain plug. The bulb 144 is preferably molded of natural rubber and has a plurality of external, longitudinally spaced, circumferentially extending ribs 172. The bulb further has a plurality of external, circumferentially spaced, longitudinally extending ribs 173. The purpose of this waffle construction is to reduce the chances of the bulb being punctured during insertion or withdrawal of the device from a pipe having a sharp edge or edges. The ribs also insure that the bulb will not slip in the conduit. The bulb 172 is shown in its deflated condition in FIG. 8 and in its inflated condition in FIG. 12. Preferably, the walls of the bulb are relatively thick so that the bulb can undergo significant expansion laterally of its longitudinal axis without danger of rupturing.

Means are provided for connecting the lower end of the hose 156 with the upper end of the bulb 144. Specifically, a connector 174 is inserted into the upper end of the bulb 144 and is clamped thereto. A connector 174a (FIG. 13) having the same shape as the connector 174 in FIG. 8 is also utilized to connect the lower end of the hose 158 to the upper end of the lower bulb 156. As seen in FIG. 13, the connector 174a has an upwardly opening enlarged cylindrical portion 176 which is formed integrally with a lower tubular portion 178. The lower end of the tubular portion 178 terminates in a barbed portion 180. Preferably, the hoses 150, 156 and 158 are made of clear PVC flexible plastic material. The connector 174a may be made of a rigid PVC plastic material.

As previously mentioned, the hose 156 (FIG. 8) is connected to the upper bulb 144 in the same fashion that the hose 158 (FIG. 13) is connected to the lower bulb 156. The lower tubular portion 178 is inserted into an upper neck portion 182 of the bulb 146. The barbed portion 180 of the connector seats within an annular groove formed in the inside wall of the neck 182. A stainless steel or aluminum ferrule 184 tightly surrounds the neck portion 182 and clamps the bulb to the connector 174a to provide a water-tight seal therebetween. The clamping action forces the barbed portion 180 of the connector 174 into the neck portion 182 causing the same to deform around the barbed portion.

A stainless steel retaining clip 186 (FIG. 13) is seated against the bottom wall of the cylindrical portion 176 of the connector 174a. Similar retaining clips are used elsewhere in the third embodiment. The shape of the retaining clip 186 is illustrated in FIG. 11. It has a pair of outer semi-circular portions 188 connected by a cross-bar 190.

Referring again to FIG. 13, the cross-bar 190 of the retaining clip 186 has one end of a rigid stainless steel safety wire 192 looped therearound. The lower end of this safety wire is looped around a lower retaining clip 186 at the other end of the bulb. If the bulb should explode, the safety wire 192 and the retaining 186 will keep the halves of the bulb from exploding apart at high velocity. The hose 158 is preferably glued to the cylindrical portion 176 of the connector 174a after the retaining clip 186 has been inserted.

The spill over valve 170 (FIG. 8) of the third embodiment includes a generally cylindrical member 194 (FIG. 11) having a frusto-conical upper portion 196 and a tubular lower portion 198. The cylindrical member 194 further has an external annular lip or flange 200 which separates the upper and lower portions. As illustrated in FIG. 12, the lower end of the bulb 144 has an internal annular groove 202 formed therein. When the bulb 144 is in its collapsed condition, the lip 200 seats in the groove 202 to provide a water-tight seal as illustrated in FIG. 8.

As illustrated in FIGS. 8 and 12, the lower end of the bulb 144 is clamped to the tubular portion 198 by a ferrule 204. The lower end of the bulb 144 lies in contracted engagement with the cylindrical member 194 prior to the expansion of the bulb. In this state, the lip 200 of the member and the groove 202 of the lower end of the bulb are in engagement to provide a fluid-tight seal. In this condition, the lower end of the bulb overlies and seals the upper end 206 of a pair of external channels 208 (FIG. 10) formed in the cylindrical member 194. Thus no water can flow from the internal cavity 210 of the bulb 144 out of the second end of the bulb through the channels 208.

When the bulb 144 is sufficiently expanded as illustrated in FIG. 12, the lower end of the bulb spreads away from the upper ends of the channels and water flows out of the second end of the bulb as indicated by the arrows. However, the rate at which the water flows is such that the expanded size of the bulb is maintained and so the sealing engagement between the bulb and the conduit within which it resides is also maintained.

Support means such as U-shaped metal clips 212 (FIG. 11) are inserted intermediate the length of the channels 208. These clips prevent the lower end of the bulb 144 from deforming into and blocking the channels. The lower end of the safety wire 192 (FIG. 8) is hooked around a metal retaining clip 186 seated against a bottom wall in the lower end of the cylindrical member 194.

The lower end of the second bulb 146 (FIG. 13) has a barbed connector 174b squeezed therein and clamped thereto in the same fashion as the barbed connection at the upper end of this bulb. A metal retaining clip 186 seated within the connector 174b at the lower end of the bulb 146 holds the lower end of the safety wire 192. A plug 214 seals the lower connector 174b at the lower end of the second bulb 146.

FIG. 15 illustrates a fourth embodiment 216 of my invention. It includes an upper bulb 218 and a lower bulb 220. The fourth embodiment further includes a four-way coupling 222, one leg of which is connected to the upper end of a rigid pipe 224. The lower end of the pipe 224 is connected to the upper end of the bulb 218. Another leg of the four-way coupling is connected to one end of a check valve 226. The bulbs of the fourth embodiment may be pressurized and expanded by either water or air. A connector 228 on the other end of the check valve provides a means for connecting the device to a source of pressurized water. A valve assembly 230 is connected to another leg of the four-way coupling for connecting the device to a source of pressurized air.

A rigid valve stem 232 (FIG. 16) extends through a guide sleeve 233 which extends through the bulb 218, through the rigid pipe 224 and through the four-way connector and out the upper leg of the connector. A control knob 234 is attached to the upper end of the valve stem 232 and may be manually grasped to pull or push the valve stem up or down. The upper leg of the four-way connector 222 has a fluid-tight seal assembly 236 through which the guide sleeve 233 extends.

The valve stem 232 is manually moved to operate a special control valve 238 (FIGS. 15 and 16) connected between the bulbs 218 and 220. This control valve permits selective dual bulb inflation, dual bulb deflation, and independent second bulb deflation.

The control valve 238 is made of plastic, brass and stainless steel parts includes a first rigid cylinder 240 (FIGS. 15 and 16). The upper end of the cylinder 240 is connected by a rigid fitting 242 to the tubular portion of a spill over valve 244 connected to the lower end of the first bulb 218. The spill over valve 244 of the fourth embodiment is identical to the spill over valve 170 of the third embodiment. A second cylinder 246 is positioned concentrically within the opened end of the first cylinder 240 and is spaced from the first cylinder by a cylindrical gasket 248 (FIG. 16). The lower end of the guide sleeve 233 is rigidly secured to a plug 250 tightly fit into the upper end of the second cylinder 246.

A third cylinder 252 (FIG. 16) is mounted within the second cylinder 246 of the control valve. The lower end of the valve stem 232 is connected to the upper end of the third cylinder 252. By manually moving the control knob 234 up and down, the third cylinder 252 may be slid vertically within the second cylinder to select the different valving functions hereinafter described. The second cylinder 246 has a pair of upper apertures 254 and a pair of lower apertures 256. The third cylinder 252 has a pair of upper apertures 258, and two pairs of lower apertures 260 and 262. O-rings 264, 266, 268, 270, 272 and 274 surround the third cylinder 252 and seat in annular external grooves formed therein. These O-rings isolate the various apertures to permit the valving functions hereafter described. The interior of the third cylinder communicates through a fitting 267a and a hose 267b with the internal cavity of the lower bulb 220.

Having described the construction of the control valve 238, the operation of the fourth embodiment may now be described. The bulbs and connecting hoses are inserted in a straight conduit having branches which are to be isolated and filled with water. For example, the fourth embodiment could be installed in the vertical stack 160 illustrated in FIG. 14 so that the bulbs 218 and 220 would be positioned above and below feed pipes 276 and 278. The connector 228 (FIG. 15) is then attached to a source of pressurized water. Alternatively, the valve assembly 230 is connected to a source of pressurized air. The control knob 234 is pulled upwardly to its middle position in which the third cylinder of the control valve is aligned with the second cylinder as illustrated in FIG. 17. In this alignment, the registration of the apertures in the second and third cylinders and the seals provided by the O-rings cause both the upper and lower bulbs to be inflated. The bulbs expand against the wall of the conduit or stack 160 (FIG. 14) to provide fluid-tight seals. Thereafter, when a predetermined pressure is reached within the upper bulb 218, fluids spills out of the spill over valve 244, filling the feed pipes 276 and 278.

After the pipe construction has been inspected for leaks, the control knob 234 may be pulled all the way out so that the second and third cylinders in the control valve are in their relative positions illustrated in FIG. 18. In this position, fluid within the lower bulb 220 can drain out of the control valve as indicated by the arrows in FIG. 18. However, the registration of the apertures and O-rings in the control valve is such that fluid stays within the upper bulb 218. Thus the upper bulb maintains its seal and water does not splash out of the conduit 160 against the operator. Deflating the second bulb 220 prior to, and independent of the deflation of the first bulb permits the water in the feed pipes 276 and 278 to drain down the conduit 160.

Once the test water has drained away, the control knob 234 may be pushed all the way in. This causes the second and third cylinders of the control valve to align in the positions illustrated in FIG. 16. The registration of the apertures in the control valve and the positions of the O-rings then permit fluid from both bulbs to drain out of the control valve and down the pipe 160. The device may then be withdrawn.

Having described preferred embodiments of my improved sewer and drain plug, it should be apparent to those skilled in the art that my invention permits of further modification in both arrangement and detail. The hoses connecting the bulbs and connectors can be made many different lengths. The device can be reconfigured in the field. A plug could be used to seal the connector 174 of the bulb and spill over valve combination illustrated in FIG. 8. The hose and check valve would then be connected to the tubular portion 198 of the spill over valve. The device could then be inserted downwardly into a vertical drainage pipe, the bulb inflated, and the pipe filled with a stack of water above the bulb. This would eliminate the need for installing Y-junctions on each floor of a drainage pipe and a high-rise building.

A flexible tube may extend from the tested area, e.g. between the two expanded bulbs to the outside of the pipe construction and connected to a guage to permit the user to observe the test pressure.

In addition, my invention can be utilized with a wide variety of pipe configurations other than those illustrated and described herein. Therefore, the protection afforded my invention should be limited only in accordance with the scope of the following claims.

I claim:
1. A plug for a drainage conduit, comprising:
   a tubular bulb made of an elastomeric material and expansible laterally of its longitudinal axis by a predetermined amount of fluid pressure supplied to its internal cavity to thereby seal the conduit when located internally thereof;

means for supplying fluid under pressure to the internal cavity of the bulb through a first end of the bulb; and spill over valve means coupled to a second end of the bulb for releasing fluid from the bulb after the bulb has expanded to seal the conduit while maintaining the expanded size of the bulb and the sealing engagement between the bulb and the conduit, including a cylindrical member about which the second end of the bulb lies in contracted engagement, at least one external channel formed in the cylindrical member so that one end of the channel is connected with the internal cavity of the bulb when the bulb is expanded to seal the conduit and a support member positioned within the channel for preventing the bulb from deflecting into the channel.

2. A plug according to claim 1 wherein the cylindrical member has an external annular lip which seats in an internal annular groove in the bulb when the bulb is unexpanded.

3. A plug according to claim 1 wherein the bulb has a plurality of external, circumferentially spaced, longitudinally extending ribs and a plurality of external, longitudinally spaced, circumferentially extending ribs.

4. A plug according to claim 1 and further comprising a rigid metal wire extending longitudinally through the bulb, and means for securing the ends of the wire to corresponding ends of the bulb.

5. A plug according to claim 1 wherein the supplying means includes a barbed connector squeezed into the first end of the bulb.

6. A plug for a drainage conduit, comprising:

a tubular bulb made of an elastomeric material and expansible laterally of its longitudinal axis by a predetermined amount of fluid pressure supplied to its internal cavity to thereby seal the conduit when located internally thereof, the bulb having a plurality of external, circumferentially spaced, longitudinally extending ribs and a plurality of external, longitudinally spaced, circumferentially extending ribs;

means for supplying fluid under pressure to the internal cavity of the bulb through a first end thereof; and spill over valve means coupled to a second end of the bulb for releasing fluid from the bulb after the bulb has expanded to seal the conduit while maintaining the expanded size of the bulb and the sealing engagement between the bulb and the conduit, the spill over valve means including a cylindrical member about which the second end of the bulb lies in contracted engagement, at least one external channel formed in the cylindrical member so that one end of the channel is connected with the internal cavity of the bulb when the bulb is expanded to seal the conduit, and a support member positioned within the channel for preventing the bulb from deflecting into the channel.

7. A plug according to claim 6 wherein the cylindrical member has an external annular lip which seats in an internal groove in the bulb when the bulb is unexpanded.

8. A plug according to claim 6 and further comprising a rigid metal wire extending longitudinally through the bulb, and means for securing the ends of the wire to corresponding ends of the bulb. corresponding ends of the bulb.

9. A plug according to claim 6 wherein the supplying means includes a barbed connector squeezed into the upper end of the bulb.

10. A plug for a drainage conduit, comprising:

a tubular bulb made of an elastomeric material and expansible laterally of its longitudinal axis by a predetermined amount of fluid pressure supplied to its internal cavity to thereby seal the conduit located internally thereof, a first end of the bulb having an internal annular groove formed therein;

means for supplying fluid under pressure to the internal cavity of the bulb through a second end of the bulb; and spill over valve means coupled to the first end of the bulb for releasing fluid from the bulb after the bulb has expanded to seal the conduit while maintaining the expanded size of the bulb and the sealing engagement between the bulb and the conduit, including a cylindrical member about which the second end of the bulb lies in contracted engagement, the cylindrical member having an external annular lip which seats in the internal annular groove of the bulb when the bulb is unexpanded, at least one external channel formed in the cylindrical member so that one end of the channel is connected with the internal cavity of the bulb when the bulb is expanded to seal the conduit, and a support member positioned within the channel for preventing the bulb from deflecting into the channel.

11. A plug according to claim 10 wherein the bulb has a plurality of external, circumferentially spaced, longitudinally extending ribs and a plurality of external, longitudinally spaced, circumferentially extending ribs.

12. A plug according to claim 10 and further comprising a rigid metal wire extending longitudinally through the bulb, and means for securing the ends of the wire to corresponding ends of the bulb.

13. A plug according to claim 10 wherein the supplying means includes a barbed connector squeezed into the second end of the bulb.

14. A plug for a drainage conduit, comprising:

a tubular bulb made of an elastomeric material and expansible laterally of its longitudinal axis by a predetermined amount of fluid pressure supplied to its internal cavity to thereby seal the conduit when located internally thereof, the bulb having an internal annular groove formed in a first end thereof, a plurality of external, circumferentially spaced, longitudinally extending ribs, and a plurality of external, longitudinally spaced, circumferentially extending ribs;

means for supplying fluid under pressure to the internal cavity of the bulb through a second end of the bulb; and spill over valve means coupled to the first end of the bulb for releasing fluid from the bulb after the bulb has expanded to seal the conduit while maintaining the expanded size of the bulb and the sealing engagement between the bulb and the conduit, including a cylindrical member about which the first end of the bulb lies in contracted engagement, the cylindrical member having an external annular lip which seats in the internal annular groove in the bulb when the bulb is unexpanded, the cylindrical member further having at least one external channel formed therein so that one end of the channel is connected with the internal cavity of the bulb when the bulb is expanded to seal the conduit, and a support member positioned within the channel for preventing the bulb from deflecting into the channel.

15. A plug for a pipe construction having a pair of branch conduits, comprising:
   a pair of tubular bulbs, each made of an elastomeric material and expansible laterally of its longitudinal axis by a predetermined amount of fluid pressure supplied to its internal cavity to thereby seal one of the conduits when located internally thereof;
   means for supplying fluid under pressure to the internal cavity of a first one of the bulbs through a first end thereof;
   means for supplying fluid under pressure from a second end of the first bulb to a first end of the second bulb;
   means for sealing a second end of the second bulb; and
   spill over valve means coupled to one of the bulbs for releasing fluid therefrom after both the first and second bulbs have expanded to seal the conduits within which they are located while maintaining the expanded sizes of the bulbs and the sealing engagement between the bulbs and their respective conduits.

16. A plug according to claim 15 and further comprising control valve means for collapsing the second bulb prior to, and independent of, the collapsing of the first bulb.

17. A plug according to claim 15 wherein each bulb has a plurality of external, circumferentially spaced, longitudinally extending ribs and a plurality of external, longitudinally spaced, circumferentially extending ribs.

18. A plug according to claim 15 wherein the spill over valve means is coupled to the second end of the first bulb and includes a cylindrical member about which the second end of the first bulb lies in contracted engagement, and at least one external channel formed in the cylindrical member so that one end of the channel is connected with the internal cavity of the first bulb when the first bulb is expanded to seal the conduit within which it is located.

19. A plug according to claim 18 wherein the means for supplying fluid under pressure to the second bulb comprises a hose connected at its first end to the cylindrical member of the spill over valve means and at its second end to a first end of the second bulb.

20. A plug according to claim 15 wherein the means for supplying fluid under pressure to the internal cavity of the first bulb includes a hose.

21. A plug according to claim 20 and further comprising a disk secured to the hose and having a diameter larger than the inside diameter of the conduit into which the first bulb is to be located.

22. A plug according to claim 15 wherein the means for supplying fluid under pressure to the internal cavity of the first bulb includes a check valve.

23. A plug according to claim 15 and further comprising control valve means for selectively permitting both bulbs to be simultaneously inflated, both bulbs to be simultaneously deflated, and the second bulb to be deflated independent of and prior to the deflation of the first bulb.

* * * * *

UNITED STATES PATENT AND TRADEMARK OFFICE
CERTIFICATE OF CORRECTION

PATENT NO. : 4,460,019

DATED : July 17, 1984

INVENTOR(S) : Duane R. Condon

It is certified that error appears in the above-identified patent and that said Letters Patent are hereby corrected as shown below:

Column 14, line 1, after the word "bulb", delete "corresponding ends of the bulb".

Signed and Sealed this

Twenty-fifth Day of December 1984

[SEAL]

Attest:

GERALD J. MOSSINGHOFF

Attesting Officer

Commissioner of Patents and Trademarks